(12) United States Patent
Kobayashi

(10) Patent No.: US 8,482,148 B2
(45) Date of Patent: Jul. 9, 2013

(54) SOLAR THERMAL POWER GENERATION APPARATUS

(75) Inventor: Kinya Kobayashi, Tokyo (JP)

(73) Assignee: Kannon Energy Co., Ltd., Tokyo (JP)

( * ) Notice: Subject to any disclaimer, the term of this patent is extended or adjusted under 35 U.S.C. 154(b) by 350 days.

(21) Appl. No.: 12/918,070

(22) PCT Filed: Mar. 10, 2010

(86) PCT No.: PCT/JP2010/054057
§ 371 (c)(1),
(2), (4) Date: Nov. 30, 2010

(87) PCT Pub. No.: WO2010/119739
PCT Pub. Date: Oct. 21, 2010

(65) Prior Publication Data
US 2011/0074164 A1  Mar. 31, 2011

(30) Foreign Application Priority Data
Apr. 15, 2009  (JP) ................................. 2009-098570

(51) Int. Cl.
*F03D 9/00* (2006.01)

(52) U.S. Cl.
USPC ............................... 290/55; 290/44; 60/641.1

(58) Field of Classification Search
USPC ........................................... 290/55; 60/641.8
See application file for complete search history.

(56) References Cited

U.S. PATENT DOCUMENTS

| 4,002,032 A | * | 1/1977 | Bash | 60/641.15 |
| 4,379,972 A | * | 4/1983 | Sosa et al. | 290/44 |
| 4,406,579 A | * | 9/1983 | Gilson | 415/2.1 |
| 4,433,544 A | * | 2/1984 | Wells et al. | 60/641.12 |
| 4,491,740 A | * | 1/1985 | Siegel | 290/55 |
| 4,507,916 A | * | 4/1985 | Anderson | 60/641.1 |
| 5,300,817 A | | 4/1994 | Baird | |
| 5,381,048 A | * | 1/1995 | Baird | 290/55 |
| 7,481,057 B2 | * | 1/2009 | Patwardhan | 60/641.8 |
| 7,779,635 B2 | * | 8/2010 | Lin | 60/641.11 |
| 2007/0245730 A1 | | 10/2007 | Mok | |
| 2009/0095339 A1 | * | 4/2009 | Nightingale | 136/244 |
| 2009/0262525 A1 | * | 10/2009 | Lai | 362/192 |
| 2010/0018205 A1 | * | 1/2010 | Chen | 60/641.8 |
| 2011/0021134 A1 | * | 1/2011 | Zwern | 454/343 |
| 2011/0095538 A1 | * | 4/2011 | Tabe | 290/55 |

FOREIGN PATENT DOCUMENTS

| JP | 2003-269322 | 9/2003 |
| JP | 2007-132330 | 5/2007 |

\* cited by examiner

*Primary Examiner* — Joseph Waks
(74) *Attorney, Agent, or Firm* — The Law Office of Michael E. Kondoudis

(57) ABSTRACT

A solar thermal power generation apparatus including: a turbine rotatable around a vertical axis, a power generator driven by turbine; a funnel disposed along vertical axis so as to house turbine and having an intake port at the lower end of funnel; and a transparent box body disposed so as to surround a lower portion of the funnel and having the air intake port at a position being lower than the intake port and a heat collector disposed in a standing manner at a distance between the box body and the funnel. An upper end of the heat collector is at a position being higher than the intake port. By using an updraft occurred by heating air having flown from the air intake port into the inside of the box body by the heat collector, the turbine is rotated, which causes the power generator to generate power.

10 Claims, 13 Drawing Sheets

SOLAR THERMAL POWER GENERATION APPARATUS

TECHNICAL FIELD

The present invention relates to a solar thermal power generation apparatus for capturing electric energy by using solar heat (including solar light).

BACKGROUND TECHNOLOGY

With increased focusing on environmental problems in recent years, attention is paid to a solar thermal power generation apparatus utilizing natural energy.

A known solar thermal generation apparatus of prior art includes one having a solar heat collector and a heat storage tank to accumulate heat energy for performing heat exchange, and a boiler to heat thermal media warmed by the heat exchanger in the heat storage tank (see Patent Reference 1) and another having a solar heat collector to evaporate an evaporative liquid and a reciprocal expansion machine equipped with a magnetic displacer in its inside portion to dispose a coil on an outer circumference (see Patent Reference 2), and the like.

Patent Reference 1: Japanese Patent Application Laid-open No. 2007-132330
Patent Reference 1: Japanese Patent Application Laid-open No. 2003-269322

DISCLOSURE OF THE INVENTION

Problems to be Solved by the Invention

However, the conventional solar thermal power generation apparatuses have problems in that installation of not only the solar heat collector but also a circulating apparatus using a liquid is required and costs are also increased for working such as maintenance and/or for preparing parts caused by the introduction of other large machines such as a boiler or expansion machine, and limitations or restrictions occur which are caused by large-scale apparatuses and/or noises.

Moreover, the conventional solar thermal power generation apparatuses present another problem in that installation of not only the solar heat collector but also the circulating apparatus using a liquid is required and, therefore, it is difficult to use other natural energy in combination resulting in a decrease of general versatility.

The present invention is designed with respect to the above problems and has an object to provide a solar thermal power generation apparatus which requires no installation of a large machine such as a boiler and/or expansion machine and which enables the reduction in working costs and part costs and enables the lowering of restrictions.

Furthermore, the present invention has another object to provide the solar thermal power generation apparatus which can use other natural energy and can improve general versatility.

Means for Solving Problem

In order to solve the above problems, the solar thermal power generation apparatus of the present invention is characterized by having a turbine rotatable around a vertical axis, a power generator driven by the turbine, a funnel disposed along the vertical axis so as to house the turbine and having an intake port at a lower end of the funnel, a transparent box body disposed so as to surround a lower portion of the funnel and having an air intake port at a position being lower than the intake port, and a heat collector disposed in a standing manner at a distance between the box body and the funnel wherein an upper end of the heat collector is at a position being higher than the intake port, wherein, after air having flown from the air intake port into an inside of the box body is heated by the heat collector, the heated air becomes an updraft flowing from the intake port into an inside of the funnel to rotate the turbine, which causes the power generator to generate power.

It is preferable that the funnel of the solar thermal power generation apparatus has an introducing side cylindrical portion constituting the lower portion of the funnel and facing an inside of the box body and an exhaust side cylindrical portion positioned in an upper portion of the box body, wherein the exhaust side cylindrical portion is constructed of a solar light panel.

It is preferable that at least part of the heat collector of the solar thermal power generation apparatus is made up of the solar light panel or uses a solar cell in an embedded manner.

It is preferable that the funnel is made up of an introducing side cylindrical portion constituting the lower portion of the funnel and facing the inside of the box body and of the exhaust side cylindrical portion positioned in an upper portion of the box body, wherein the exhaust side cylindrical portion has a vibration plate and a piezoelectric element and which the vertical axis has wheels each being contactable with the vibration plate.

It is preferable that the vertical axis extrudes in an upward direction of the funnel and a wind mill is attached to the extruded portion.

It is preferable that the funnel is made up of an introducing side cylindrical portion constituting the lower portion of the funnel and facing the inside of the box body and the exhaust side cylindrical portion positioned in an upper portion of the box body, wherein, on the exhaust side cylindrical portion, a thermoelectric element is mounted and, on the outside of the exhaust side cylindrical portion, sealed space filled with a cooling agent is provided.

It is preferable that a heat storing member is placed in a lower portion of the funnel placed in the lower direction of the turbine of the solar thermal power generation apparatus.

The solar thermal power generation apparatus of the present invention is characterized by having a turbine rotatable around a vertical axis, a power generator driven by the turbine, a funnel disposed along the vertical axis so as to house the turbine and having an intake port at a lower end of the funnel, a transparent box body disposed in a lower direction of the turbine in a manner to be contracted and closed from a lower direction toward an upper direction of the turbine, a heat collector disposed inside the box body with an interval between the heat collector and box body and to be contracted and closed from a lower direction of the heat collector toward a direction of the turbine and having a spraying cylindrical portion disposed integrally at an upper end of the heat collector with a predetermined interval between the box body and the heat collector in an opposite manner, an air intake port formed at a lower end of the box body, an intake port formed at a lower end of the heat collector, and a heat storing member disposed in the spraying cylindrical portion, wherein, after air having flown from the air intake port and the intake port into the inside of the box body and the flown air is heated by the heat collector, the heated air is used as an updraft to rotate the turbine, which causes the power generator to generate power.

The solar thermal power generation apparatus of the present invention is characterized by having a funnel having an exhaust port formed at an upper end of the funnel and an intake port formed at a lower end of the funnel, a transparent box body having an air intake port formed at a position being lower than the intake port of the funnel, sealed space formed inside the box body and having an inside portion filled with a cooling agent, a thermoelectric element making up an outer circumferential wall of the sealed space, and a heat collector disposed, in a standing manner, inside the box body existing outside the thermoelectric element and having an upper end placed in a position being higher than the air intake port, wherein, after air having flown from the air intake port into an inside of the box body is heated by the heat collector, the heated air becomes an updraft flowing from the intake port into an inside of the funnel to be exhausted from the exhaust port and wherein the thermoelectric element is heated by solar light having transmitted through the box body.

It is preferable that the solar thermal power generation apparatus is made up of the turbine rotatable around the vertical axis and a power generator driven by the turbine, wherein, after air having flown from the air intake port into an inside of the box body is heated by the heat collector, the heated air becomes an updraft flowing from the intake port into an inside of the funnel to rotate the turbine, which causes the power generator to generate power.

It is preferable that the solar thermal power generation apparatus is made up of a wind mill being rotatable by the heated air having become the updraft and wherein the wind mill comprises a circularly cylindrical body being rotatable around the vertical axis and a large number of wheels attached to an outer circumferential wall of the circularly cylindrical body and wherein a piezoelectric element and a vibration plate covering the piezoelectric element disposed on an inner circumferential surface of the circularly cylindrical body are disposed and a large number of spherical bodies are provided inside the circularly cylindrical body so as to be rolled on the vibration plate It is preferable that the solar thermal power generation apparatus is made up of a semi-circularly cylindrical outer cylindrical body disposed on an outer circumference of the wind mill, the piezoelectric element and vibration plate disposed in an inner circumferential surface of the outer cylindrical body, wherein each of the wheels formed on the circularly cylindrical body is in contact with the vibration plate of the outer cylindrical body.

It is preferable that an outer circumferential wall of the box body of the solar thermal power generation apparatus is constructed of a solar light panel and a transparent plate.

The solar thermal power generation apparatus may have a light-gathering lens placed on the box body.

The solar thermal power generation apparatus may have convex and concave surfaces formed on the heat collector.

The solar thermal power generation apparatus may have a reflection plate to reflect solar light at the box body disposed on a north side of the box body.

Effects of the Invention

The present invention has effects of eliminating the need for using a large-scale machine such as a boiler and/or expansion machine and of reducing restrictions on installation location or the like.

BEST MODE OF CARRYING OUT THE INVENTION

Hereinafter, an embodiment of a solar thermal power generation of the present invention is described by referring to drawings. Moreover, the embodiment described below is preferred concrete exemplifications of the present invention and technological various limitations are imposed thereon in some cases, however, the technological scope of the present invention, unless otherwise stated herein, is not limited to these embodiments.

First Example

Figure 1:
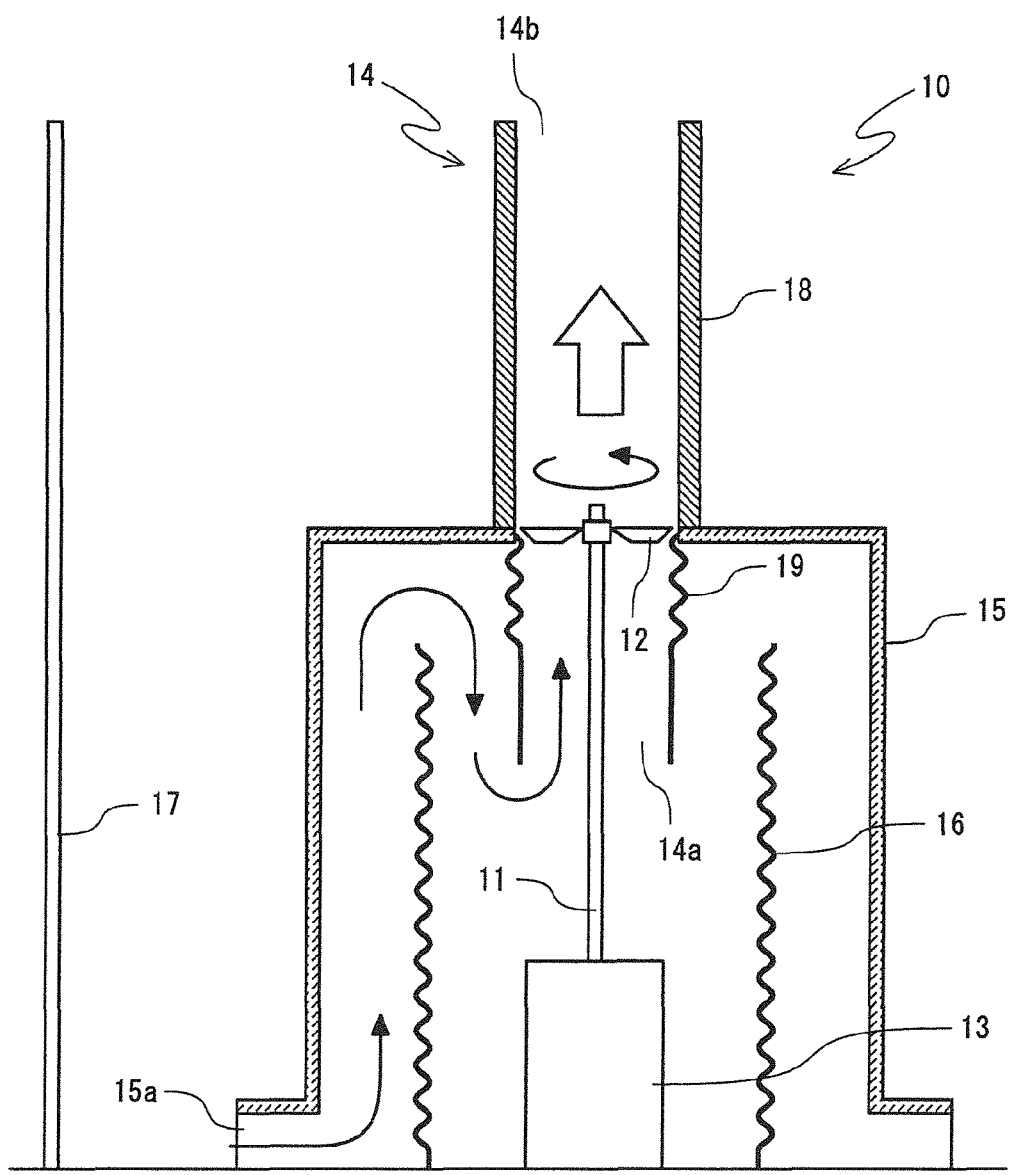
FIG. 1 is a diagram showing a solar thermal power generation apparatus of the embodiment of the present invention and explaining the solar thermal power generation apparatus using thermal heat and thermal light of the first example.
Figure 2:
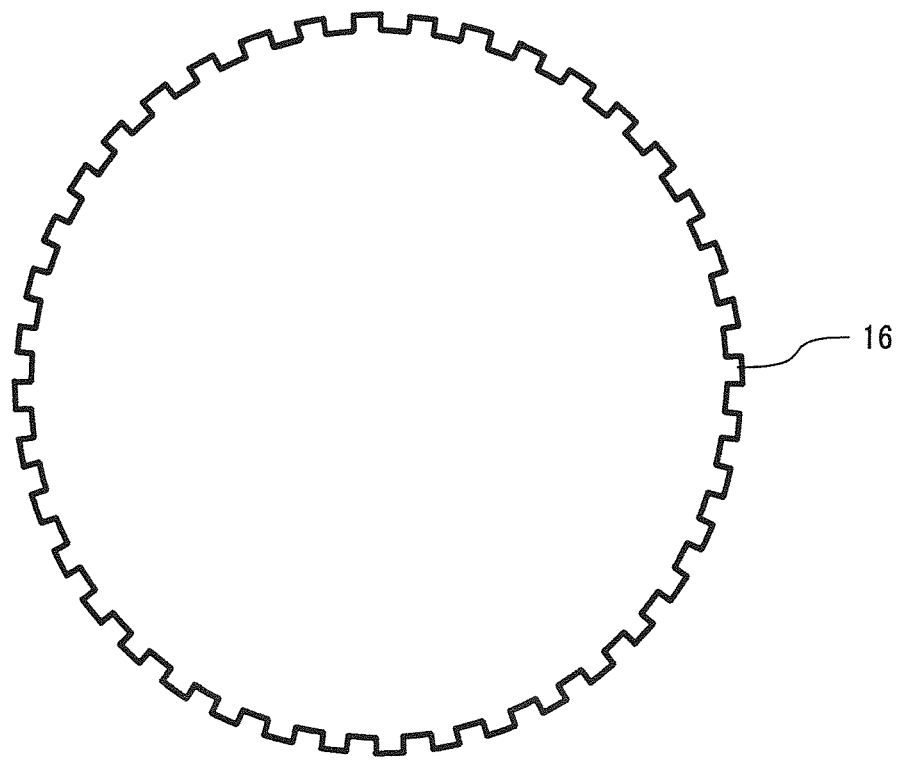
FIG. 2 is a diagram explaining a cross-sectional shape of one example of a heat collector to be applied to the solar thermal power generation apparatus of the embodiment of the present invention.
Figure 3:
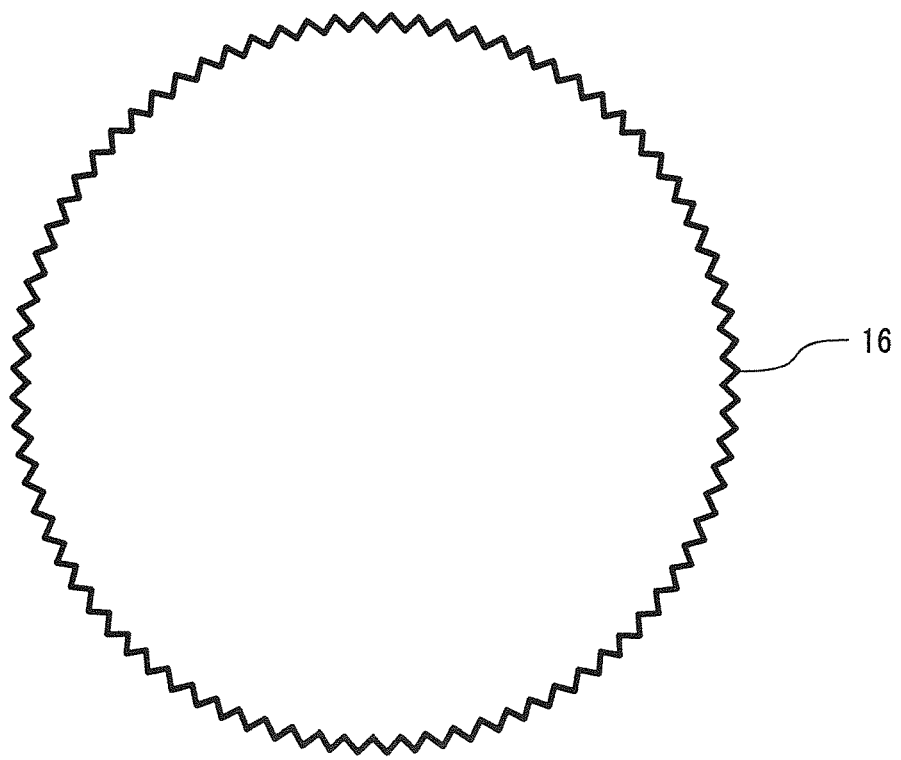
FIG. 3 is a diagram explaining a cross-sectional shape of another example of the heat collector to be applied to the solar thermal power generation apparatus of the embodiment of the present invention.

FIGS. 1 to 3 are diagrams showing the first example of the solar thermal power generation apparatus of the present invention and FIG. 1 is a diagram showing the solar thermal power generation apparatus of the first example which utilizes solar heat and solar light as natural energy and FIG. 2 is a diagram describing one example of a cross-sectional shape of the heat collector, and FIG. 3 is a diagram showing other example of a cross-sectional shape of the heat collector.

As shown in FIG. 1, the solar thermal power generation apparatus 10 is made up of a turbine 12 being rotatable around a vertical axis 11, a power generator 13 to be driven by the turbine 12, a funnel 14 disposed along the vertical axis so as to be able to house the turbine 12, a box body 15 disposed in a manner to surround a lower part of the funnel 14, the heat collector 16 disposed in a standing manner between the box body 15 and funnel 14 at a distance from each other, and a reflection plate 17 disposed outside the box body 15.

The funnel 14, in the present example, has an exhaust side cylindrical portion 18 in which no limitation is imposed on its material, which is not limited to a metal, resin, or a like, or which is constructed of a solar light panel and an introducing side cylindrical portion 19. The turbine 12 is provided at a border portion between the exhaust side cylindrical portion 18 and introducing side cylindrical portion 19. Also, the introducing side cylindrical portion 19 is made open at its lower portion wherein an air intake port 14a is disposed. The exhaust side cylindrical portion 18 and introducing side cylindrical portion 19 are put into junction in a sealed state. The exhaust cylindrical portion 18 is made open at its upper end wherein an exhaust port 14b is disposed. The invasion of rain water and/or reverse flow of natural wind into the exhaust cylindrical portion 18 can be prevented by bending or turning sideways a portion near the upper end of the exhaust cylindrical portion 18. The rotational force of the turbine 12 may be ensured by configuring the introducing side cylindrical portion 19 and funnel 14 so as to be truncated circular conical cylinder shaped in a manner in which the introducing side cylindrical portion 19 and funnel 14 are tapered upward, as a whole.

Moreover, the cross-sectional shape of the funnel 14 may be not only circularly cylindrical but also polygonally cylindrical, however, preferably right polygonal being symmetrical about the midpoint of the vertical axis 11 and the number of angles of the right polygon is preferably larger. Moreover, as the material having high heat collection property making up the introducing side cylindrical portion 19, for example, a stainless plate, copper plate, or the like may be used and, in an upper portion being not opposite to the heat collector 16, a solar cell using a solar light panel may be embedded.

In the present embodiment, the box body 15 is made of a transparent glass material having a reverse bottomed cylindrical shape. In a lower portion of the box body 15, an air intake port 15a communicating with the atmosphere is formed at a position being lower than the air intake port 14a. Moreover, the funnel 14 penetrates through an upper portion (bottomed surface) of the box body 15 and, in an upper portion of the box body 15, the exhaust side cylindrical portion 18 is disposed and, inside the box body 15, the introducing cylindrical portion 19 is disposed. Therefore, the exhaust cylindrical portion 18 and introducing cylindrical portion 19 may be fixed on a bottom of the box body 15 in a sealed state.

The material for the box body 15, so long as it is colorless transparent and has a thermal resistance to capture solar heat, may use not only the glass material but also the resin such as an acrylic resin or the like. At this time, in order to hide an internal structure, the box body 15 may use color transparent material (for example, smoke glass).

In the present embodiment, the heat collector 16 is made of the same material as that for the introducing side cylindrical portion 19 and its surface area is expanded by configuring the heat collector 16 so as to have a successive concave and convex shape (for example, having a waveform-shaped cross section) along the direction of the axial line of the vertical axis 11. The heat collector 16, as shown in FIG. 2 or FIG. 3, may have a successive concave and convex shape along the direction of a cross-section direction being orthogonal to the vertical axis. Moreover, the upper portion of the heat collector 16 is placed at a position being higher than the air intake portion 14a in a manner to surround a portion close to the lower end of the introducing side cylindrical portion 19.

The reflection plate 17 is disposed, for example, on the north side of the box body 15 and, by using its opposite surface as a mirror surface, solar light can be reflected on the heat collector 16. Therefore, the reflection plate 17 may have arc-shaped cross section surrounding the circumference of the box body 15. In the above configuration, air having flown, by the heat collector 16, into the inside of the box body 15 from the air intake port 15a is heated and the heated air becomes an updraft flowing into the inside of the funnel 14 from the air intake port 14a and rotates the turbine 12, then can drive the power generator 13.

By placing the exhaust side cylindrical portion 18 extruding from the box body 15 toward an upward direction of the funnel 14, the updraft can be effectively guided from the upper direction of the box body 15, thus enabling the rotational force of the turbine 12 to be ensured.

When a solar light panel is employed or a solar cell is embedded at least in part of the heat collector 16, exhaust side cylindrical portion 18, and introducing side cylindrical portion 19, power is generated by combined use of the solar light panel and solar cell.

Thus, by using the solar heat and solar light as natural energy other than solar heat in combination, costs for power generation can be reduced, power generating efficiency can be improved, and power generating capability per unit volume (space volume obtained by disposing the solar panel on the skew) can be also enhanced.

Second Example

Figure 4:
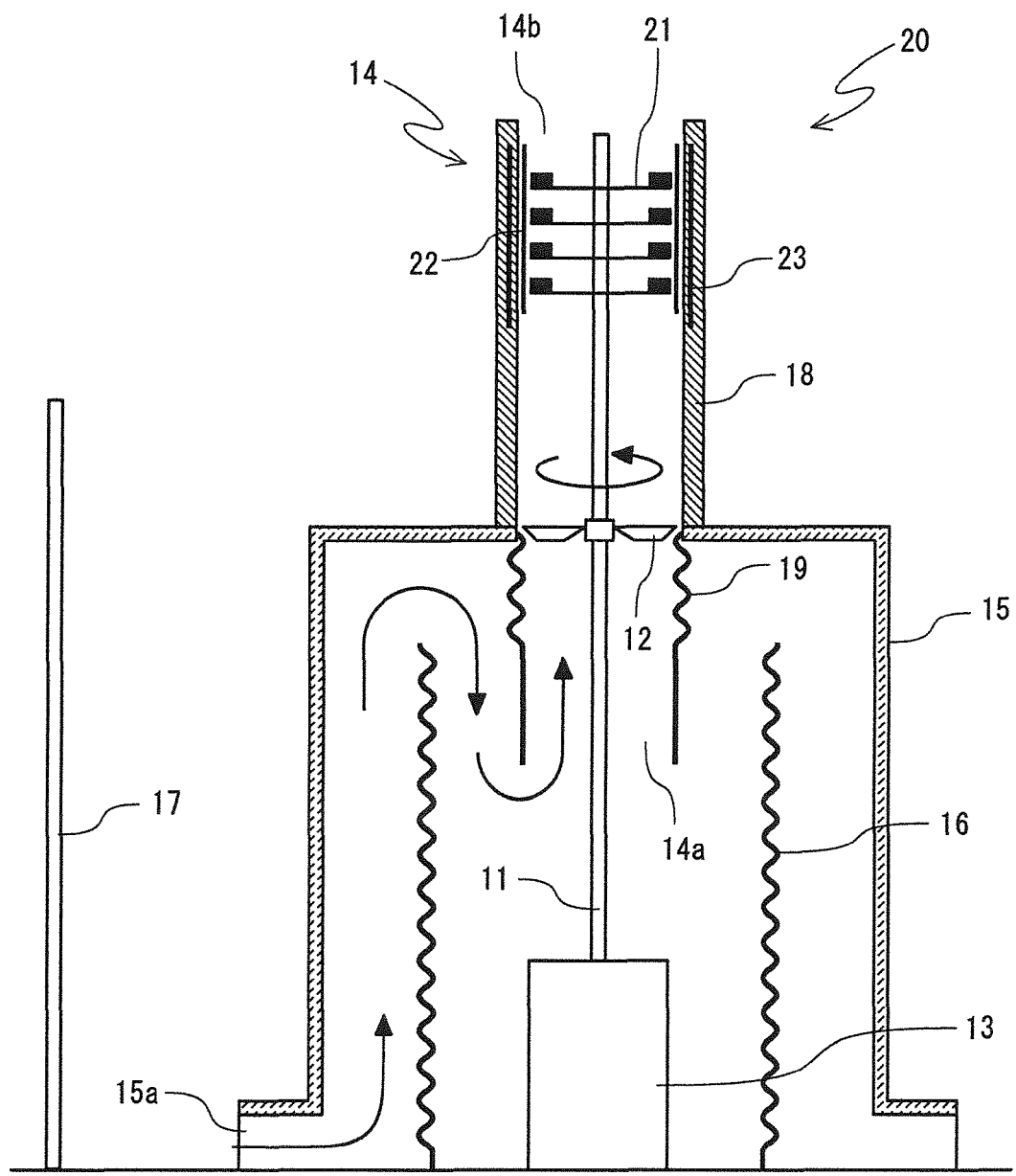
FIG. 4 is a diagram showing a solar thermal power generation apparatus of the embodiment of the present invention and explaining the solar thermal power generation apparatus using thermal heat and vibration force as natural energy of the second example.

FIG. 4 is a diagram showing a solar thermal power generation apparatus of the embodiment and explains the solar thermal power generation apparatus of the second example which uses solar heat and vibration force as natural energy. Moreover, in FIG. 4, same reference numbers are assigned to components being the same as for or similar to the components used in the above first example.

In FIG. 4, an upper end of a vertical axis 11 of the solar thermal power generation apparatus 20 is extended to a portion near an upper end of an exhaust side cylindrical portion 18. In a portion near the upper end of the vertical axis 11, a plurality of wheels 21 is disposed so as to be placed in the funnel 14.

The exhaust side cylindrical portion 18 of the second embodiment uses metal or a like, not the solar light panel shown in FIG. 1, and has vibration plates 22, in its inner wall, each of which faces a plurality of the wheels 21. Also, inside the exhaust cylindrical portion 18, piezoelectric elements 23 are placed in a manner to face the vibration plates 22.

By configuring as above, the plurality of wheels 21 rotates integrally with a turbine 12, thus causing pressure to be applied to the piezoelectric elements 23 through the vibration plates 22 and enabling power generation by vibration force in combination with power generation by solar heat.

Moreover, in the power generation by vibration force, though natural energy such as solar light or wind to be described later is not used, the rotation of the vertical axis 11 by the turbine 12 utilizing the updraft of the present invention is directly employed and source of such fuel materials (for example, gas or a like) as used in the boiler in the prior art is not employed and, therefore, the power generation by vibration force is also included in a category of power generation using the natural energy.

In addition, according to the second example, by configuring so that the wheel 21 itself is rotated by the updraft, the placement of the turbine 12 and power generator 13 is not necessarily necessary.

Third Example

Figure 5:
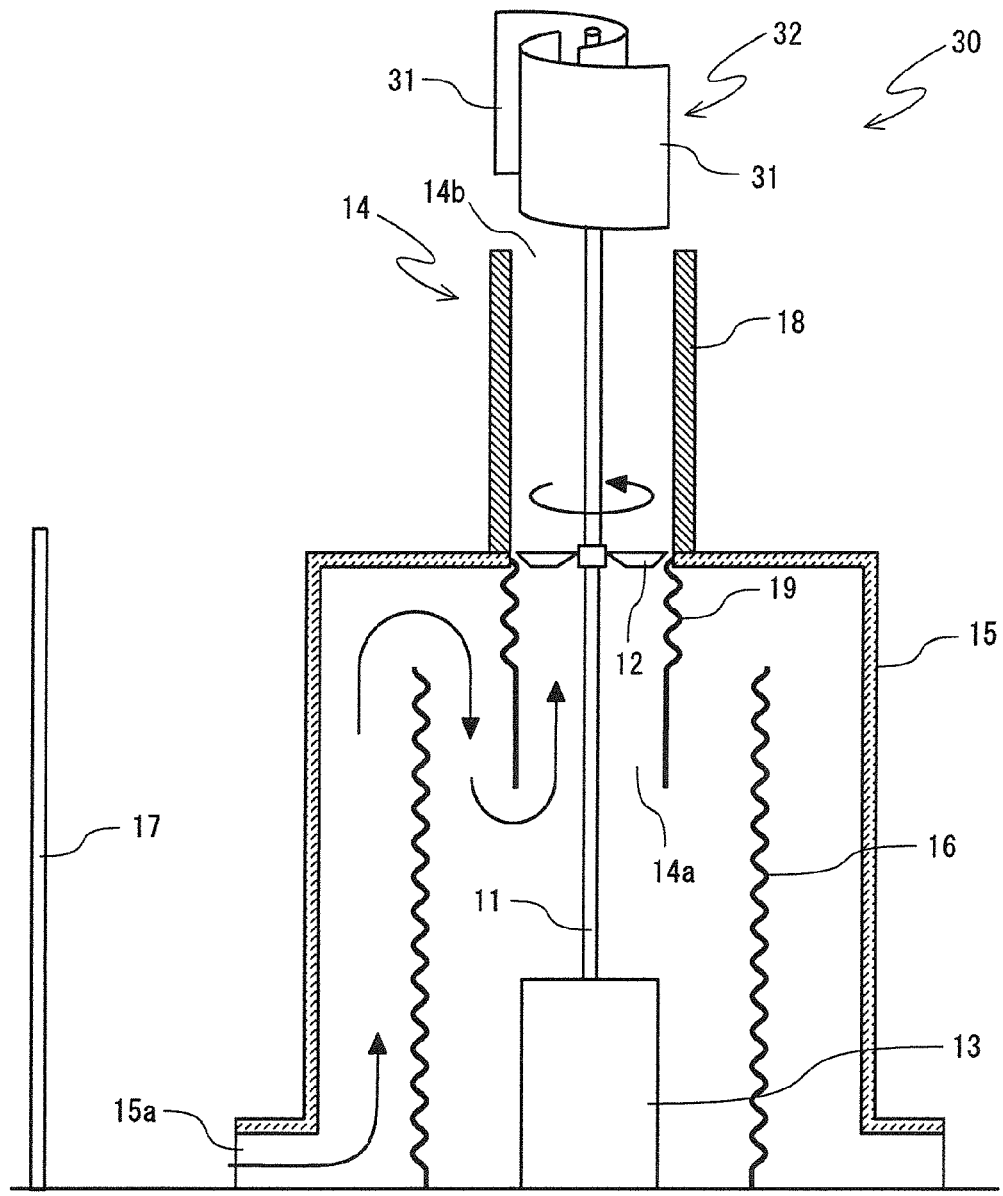
FIG. 5 is a diagram showing a solar thermal power generation apparatus of the embodiment of the present invention and explaining the solar thermal power generation apparatus using thermal heat and wind force as natural energy of the third example.

FIG. 5 is a diagram showing a solar thermal power generation apparatus of the embodiment and explaining the solar thermal power generation apparatus of the third example which utilizes solar heat and wind force as natural energy. Moreover, in FIG. 5, same reference numbers are assigned to components being the same as for or similar to the components used in the above first example and their descriptions are omitted accordingly.

As shown in FIG. 5, a vertical axis 11 of the solar thermal power generation apparatus 30 is extended until an upper end of the vertical axis 11 extrudes from an upper end of an exhaust side cylindrical portion 18 in an upward direction. At the upper end of the vertical axis 11, a wind mill 32 made up of a pair of bending guide wheels 31. Moreover, as shown in FIG. 5, a type of the wind mill 32 may be of any type including a savonius type, darius type or the like, and there is no limitation on the type of the wind mill. The exhaust side cylindrical portion 18 may be made up of a solar panel shown in the first example, metal, or the like.

By configuring as above, the wind mill 32 receives a wind from the outside to rotate integrally with the turbine 12 and can perform wind power generation in combination with the solar thermal power generation and, even in the night when the solar thermal power generation is difficult, only if a wind is available, wind power generation is made possible, thus the wind power generation and solar thermal power generation can be performed in a manner complementary to each other.

Figure 6:
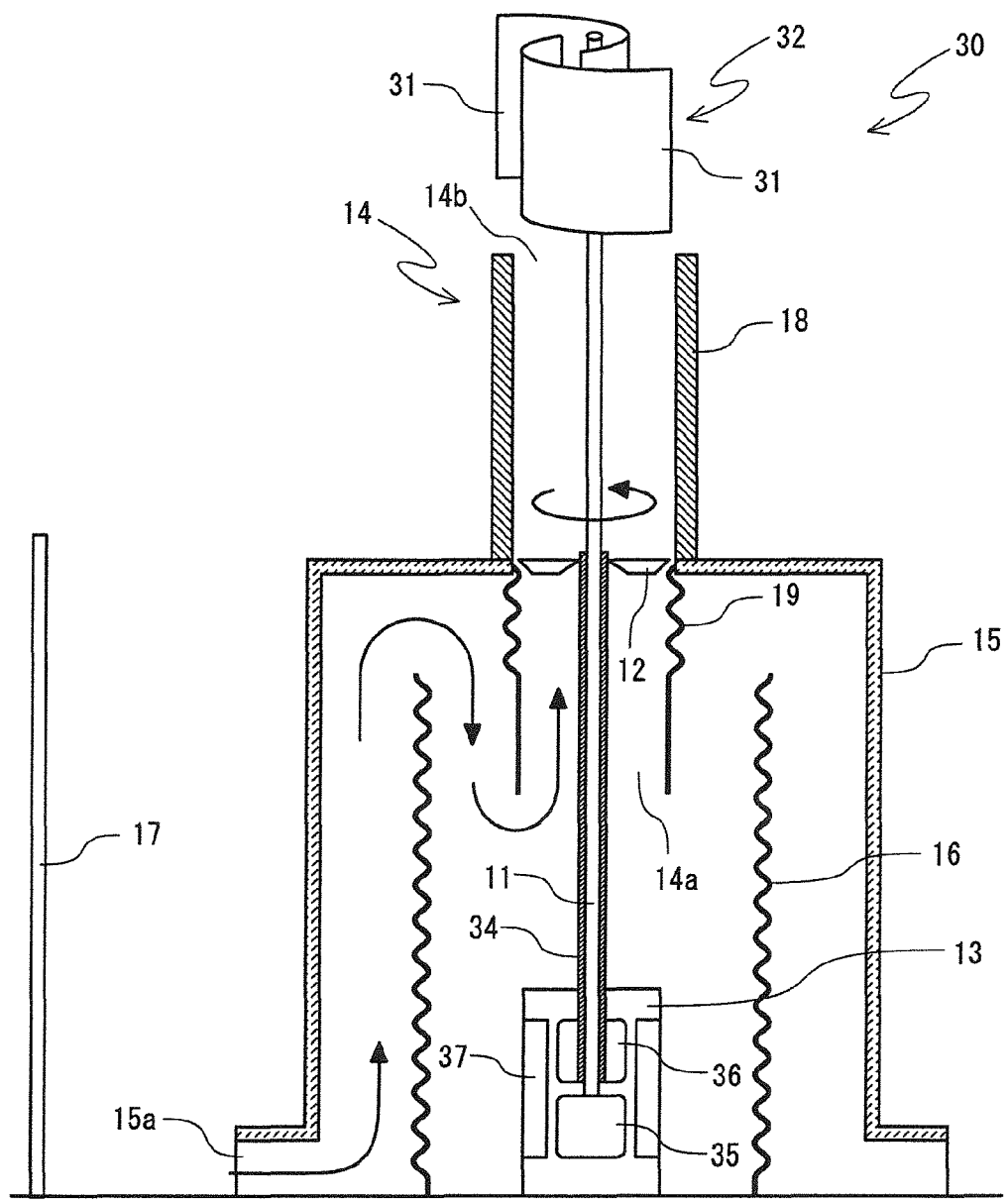
FIG. 6 is a diagram showing a solar thermal power generation apparatus of the embodiment of the present invention and explaining the solar thermal power generation apparatus using thermal heat and wind force as natural energy of an applied one of the third example.

As shown in FIG. 6, the vertical axis 11 to be used as the wind mill 32 and the axis 34 to be used as the turbine 12 may be configured so as to be rotatable individually and also inside the power generator 12, the rotor 35 for the generator disposed on the vertical axis 11 and the rotor 36 for the generator may be individually configured so as to face a stator for the generator, which enables the rotation of the wind mill 32 to be separated from the rotation of the turbine 12, thereby reducing loads imposed on each of the above components.

Fourth Example

Figure 7:
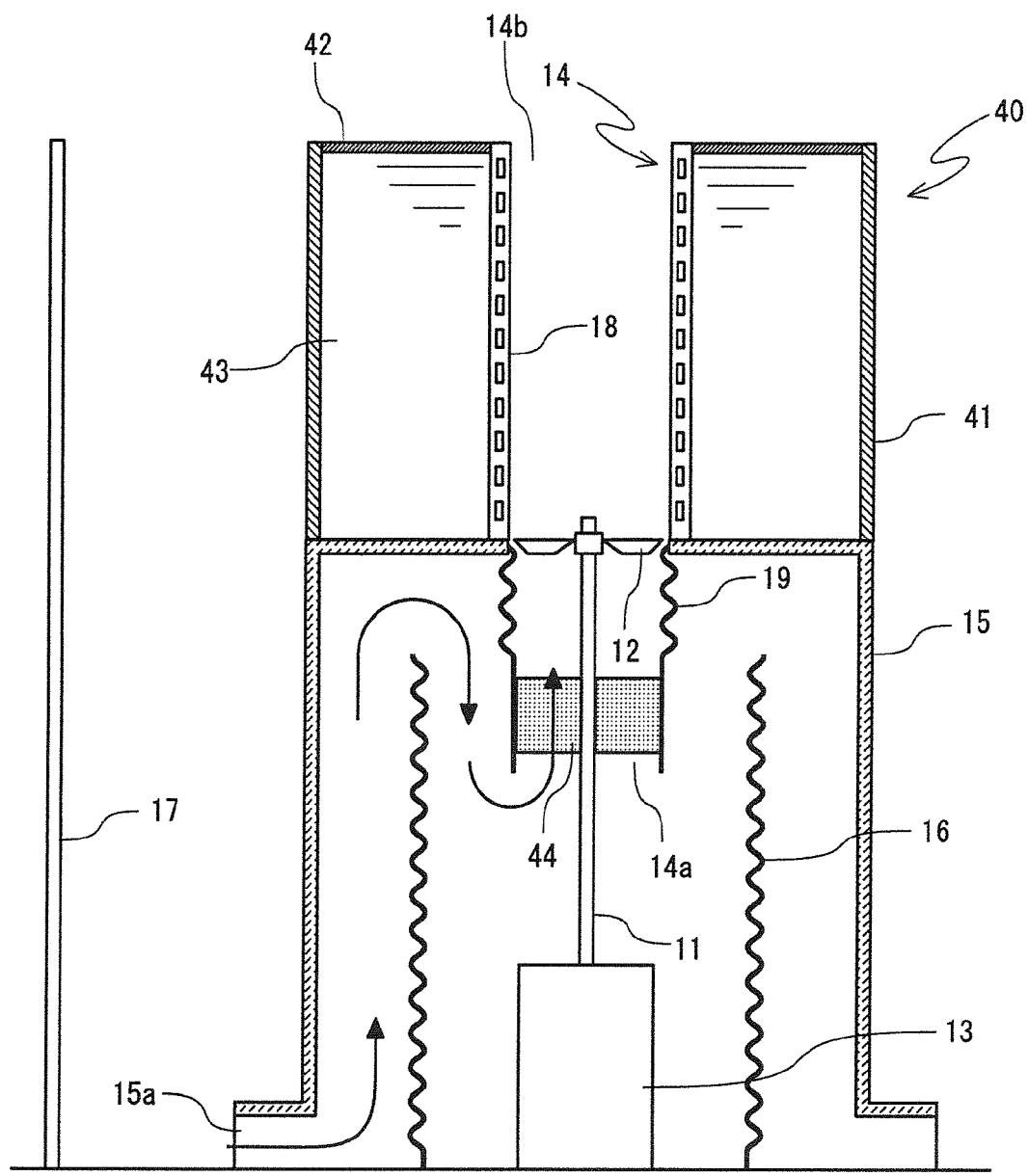
FIG. 7 is a diagram showing a solar thermal power generation apparatus of the embodiment of the present invention and explaining the solar thermal power generation apparatus using thermal heat and temperature difference as natural energy of the fourth example.

FIG. 7 is a diagram showing a solar thermal power generation apparatus of the embodiment and explaining the solar thermal power generation apparatus of the fourth example which utilizes solar heat and temperature difference as natural energy. Moreover, in FIG. 7, same reference numbers are assigned to components being the same as for or similar to the components used in the above first example and their descriptions are omitted accordingly.

As shown in FIG. 7, on an upper surface of a body box 15 of a solar thermal power generation apparatus 40, an outer cylinder 41 made of a heat shield material is disposed, in a manner in which the outer circumferential shape of the box body 15 coincides with that of the outer cylinder 41, which surrounds exhaust side cylinder portions 18 at a distance from each other. The upper edge portion of the outer cylinder 41 and the upper edge portion of the exhaust side cylindrical portion 18 are the same in height and an aperture portion made up of the upper edge portion of the outer cylinder 41 and of the upper edge portion of the exhaust side portion 18 is closed by a radiating plate 42. This causes hermetically sealed space 43 to be formed by the upper surface of the box body 15, exhaust side cylinder 18, outer cylinder 41, and radiating plate 42. The inside of the sealed space 43 is filled with a cooling agent such as water. Inside an introducing side cylinder portion 19, a heat storing member 44 is disposed so as to permit the vertical axis to pass through.

On the other hand, the exhaust side cylindrical portion 18 where the sealed space 43 being in contact with an updraft is made up of a thermoelectric element (for example, Perche element) one surface of which makes up an internal wall of the exhaust side cylinder 18 and another surface of which makes up an outer wall of the exhaust side cylinder 18. At least part of the exhaust side cylindrical portion 18 may be made up of the heat shield material.

By configuring as above, heat from the cooling agent in the sealed space 43 is emitted by radiation for cooling.

One surface of the thermoelectric element making up the exhaust side cylinder 18 comes into contact with the updraft and another surface thereof comes into contact with cooled water, which causes temperature difference, thus enabling temperature difference power generation.

Moreover, the heat storing member 44 may be employed commonly in the first to sixth examples of the embodiment.

In the fourth example, the turbine 12 and power generator 13 are not necessarily required.

Fifth Example

Figure 8:
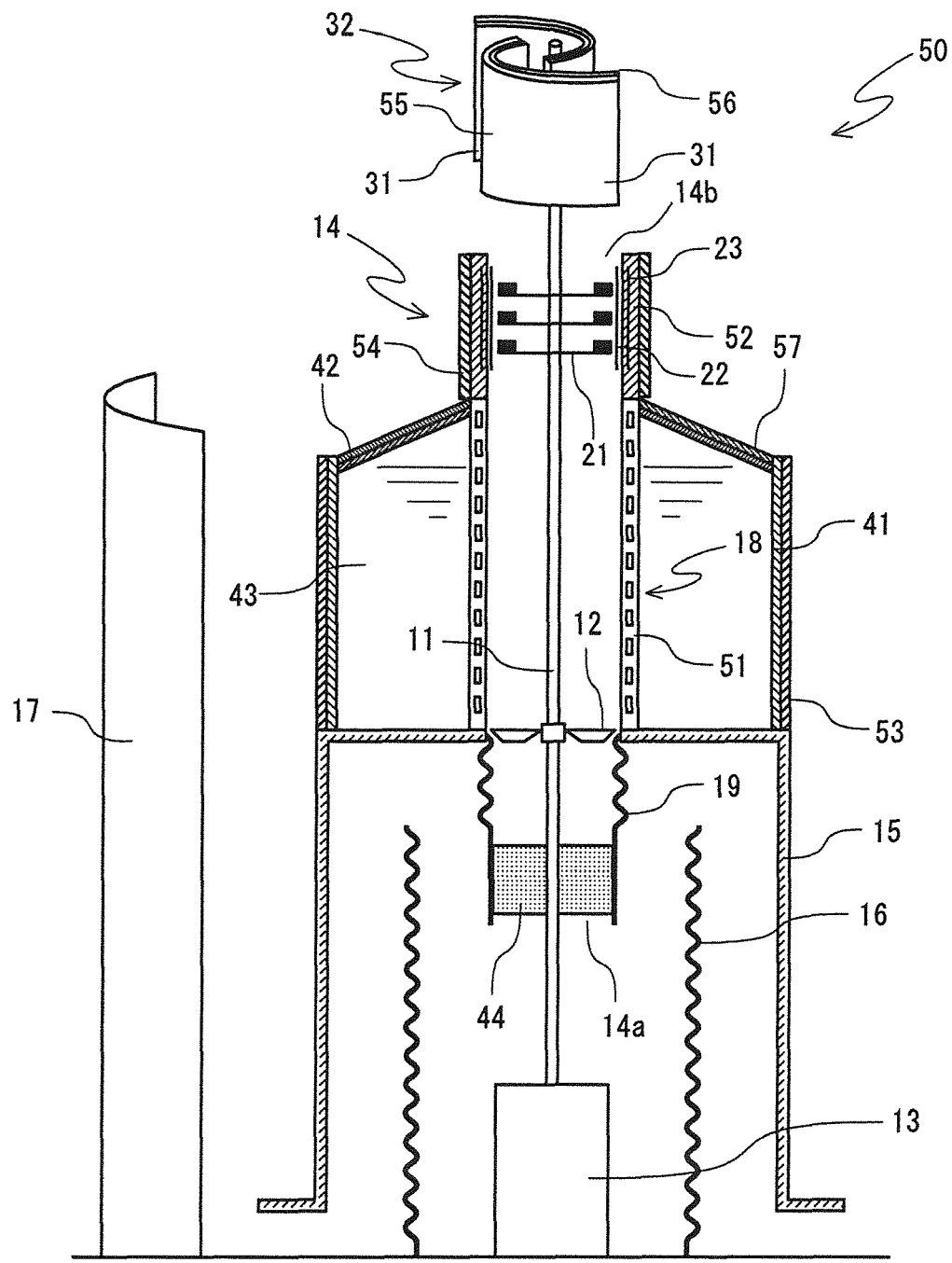
FIG. 8 is a diagram showing a solar thermal power generation apparatus of the embodiment of the present invention and explaining the solar thermal power generation apparatus using thermal heat, solar light, vibration force, wind force, and temperature difference as natural energy of the fourth example.

FIG. 8 is a diagram showing a solar thermal power generation apparatus of the embodiment and explaining the solar thermal power generation apparatus of the fifth example which utilizes solar heat, solar light, vibration force, wind force, temperature difference as natural energy. Moreover, in FIG. 8, same reference numbers are assigned to components being the same as for or similar to the components used in the above first to third examples and their descriptions are omitted accordingly.

As shown in FIG. 8, the exhaust side cylindrical portion 18 has upper and lower two stages, one being an upper circularly cylindrical portion 52 made up of vibration plates 22 being opposite to each other in a state of striding a plurality of wheels 21 and a piezoelectric element 23 and another being a lower circularly cylindrical portion 51 made up of a thermoelectric element constructing an internal wall of the sealed space 43. A solar light panel 53 is attached to an outer side of the outer cylinder 41, a solar light panel 54 to an outer side of the upper circularly cylindrical portion 52, and solar light panels 55 to both sides of a pair of bending guide wheels 31.

The radiating plate 43 making up the sealed space 43 is so configured as to be declined in a manner to be tapered upward and on the upper surface of the radiating plate 43 is attached transparent glass 57 and on the outer surface of the glass 57 is performed surface treatment coating.

A photocatalyst activated substance (for example, titanium dioxide) may be used for the surface treatment coating. By performing, for example, water spraying (or by rain water), entire glass 57 is covered by a thin water film and not only an water splinkling effect in which indoor temperatures of the glass 57 and sealed space 43 are lowered by latent heat of vaporization but also a cleaning effect (self-cleaning action) in which super hydrophilic effects, that is, adherence of rain water and/or oil to the surface can be also obtained.

By configuring as above, power generation effects using natural energy can be achieved.

Furthermore, in the solar thermal power generation apparatus 50 of the fifth example, in addition to all kinds of energy except solar heat shown in the second to fourth example, solar light is employed by using the solar light panels 53, 54, 55, and 56 and this solar light power generation may be applied to each of the second to fourth examples. Furthermore, it is not necessary to say that a plurality of above examples including the first to fourth example may be combined, for example, the first example, second example, and third example may be combined or the first example, second example, and fourth example may be combined as well.

In the fifth example, the turbine 12 and power generator 13 are not necessarily required.

Sixth Example

Figure 9:
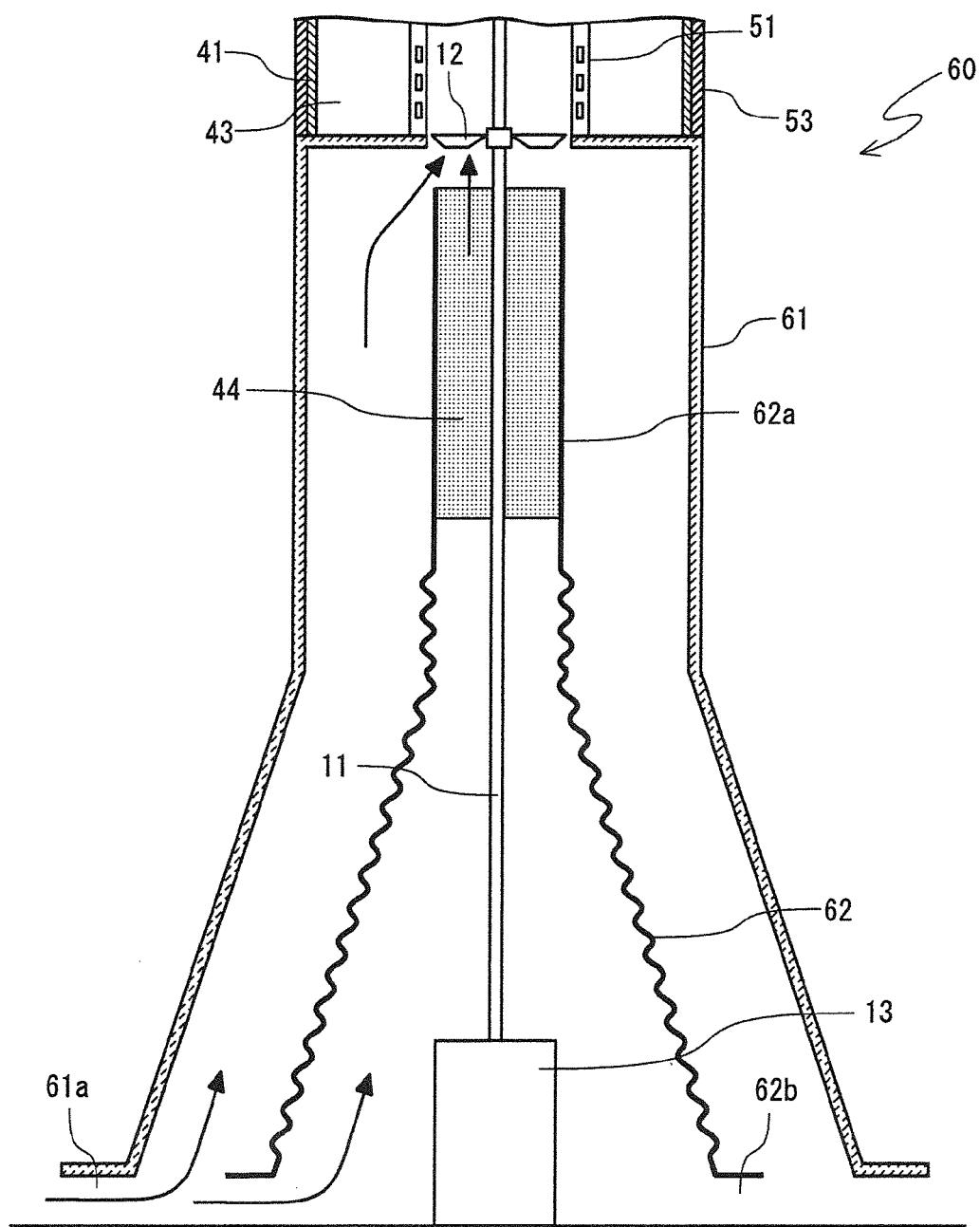
FIG. 9 is a diagram showing the solar thermal power generation apparatus of the embodiment of the present invention and explaining configurations of main components of the solar thermal power generation apparatus of the sixth example.
Figure 10:
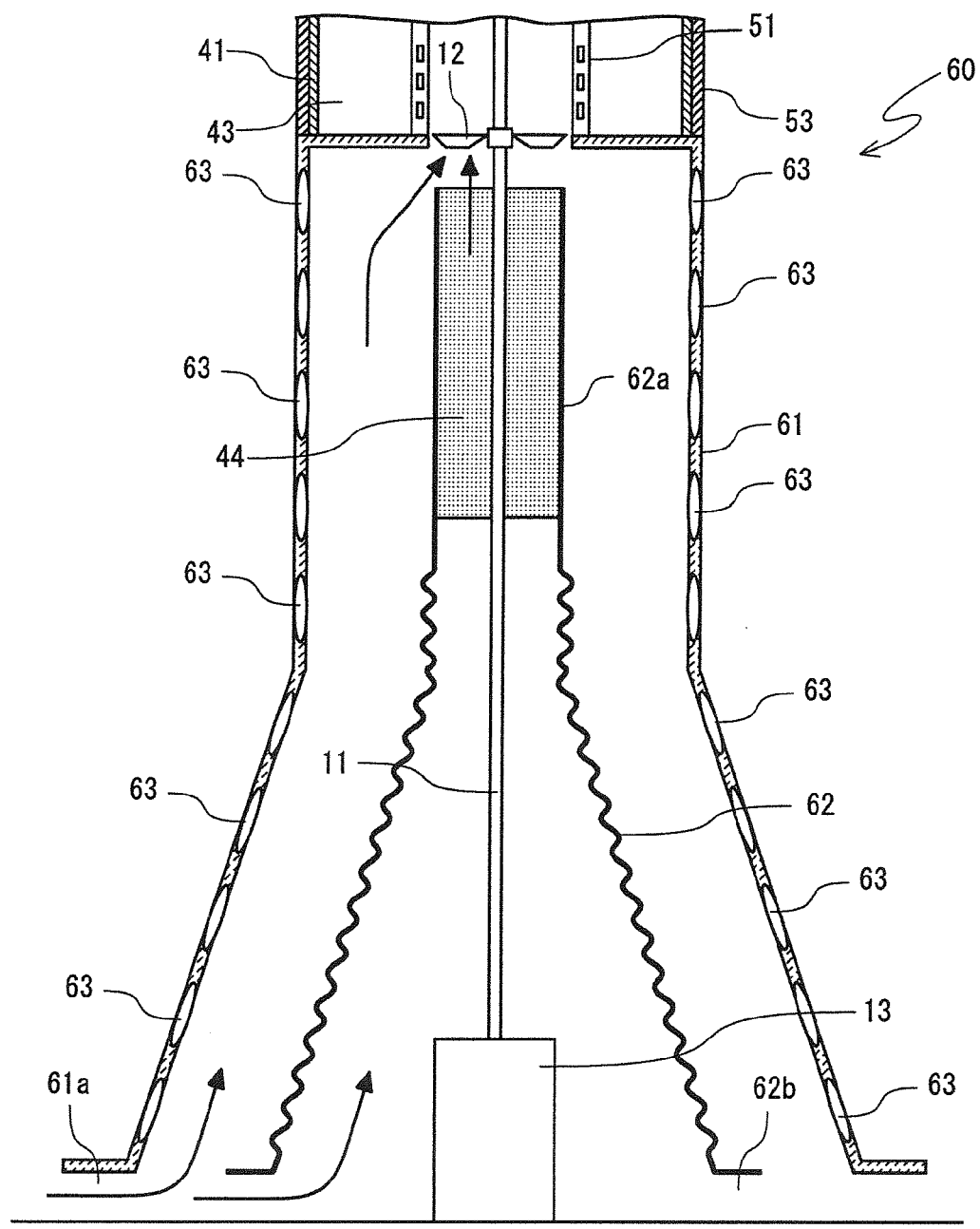
FIG. 10 is a diagram showing the solar thermal power generation apparatus of the embodiment of the present invention and explaining configurations of main components of the solar thermal power generation apparatus of a modified one of the sixth example.

FIGS. 9 and 10 are diagrams showing a solar thermal power generation apparatus showing the sixth example of the embodiment of the present invention and explaining main components of a solar thermal power generation apparatus of a modified example.

Examples are described in which outer circumferential shapes of the box body 15 and heat collector 16 are circularly cylindrical or polygonally cylindrical in the solar thermal power generation apparatuses 10, 20, 30, 40, and 50 of the first to fifth examples, however, the solar thermal power generation apparatus of the sixth example is made up of a turbine 12 being rotatable around a vertical axis 11, a power generator 13 driven by the turbine 12, a funnel 14 (lower circularly cylindrical portion 51) disposed along the vertical axis 11 so that the turbines 12 can be housed, a transparent box body 61 disposed in a downward direction of the turbine 12 and being contracted and closed from the downward to upward directions, a heat collector 62 provided integrally with a spraying cylindrical portion 62a disposed with an interval between the box body 61 and spraying cylindrical portion 62a in an opposite manner, under the turbine 12, inside the box body 61 and being contracted and closed from the lower direction toward the upper direction and toward the 12 turbine, an air intake port 61a disposed at a lower end of the box body 61, and a heat storing member 44 provided in the spraying cylindrical portion 62.

Each of the box body 61 and heat collector 62 is so configured as to have a flask shape, which is contracted and closed from the lower direction toward the upper direction, being approximately triangular when seen from the front and a conical portion (or polygonally pyramidal portion) and cylindrical portion (or polygonally prismatic portion) of the box body 61 and heat collector 62 respectively are disposed in a manner opposite to each other with a predetermined interval between the box body 61 and the heat collector 62 inside and outside areas.

Then, by making the cylindrical portion (polygonally prismatic portion) serve as the spraying cylindrical portion 62a and by placing the upper end aperture portion of the spraying cylindrical portion 62a in a position apart from the turbine 12, it is made possible to introduce the updraft having passed between the box body 61 and heat collector 62 and the updraft having passed through the inside of the heat collector 62 toward the turbine 12.

Thus, by utilizing the shape of the conical portion (polygonally conical portion) close to the lower portion of the box body 61 and heat collector 62, heat collecting effects can be improved. Part of the updraft occurred by heating the air introduced from the air intake port 61a formed at the lower end of the box body 61 and intake port 62b formed at the lower end of the heat collector 62 flows toward the turbine 12 and other updraft flows through the heat storing member 44 to the turbine 12.

Here, by disposing the heat storing member 44 in the spraying cylindrical portion 62a, a decrease of the updraft can be prevented.

Moreover, as shown in FIG. 10, by attaching a light gathering lens to an entire external wall of the box body 15, heat gathering effects can be improved.

Seventh Example

Figure 11:
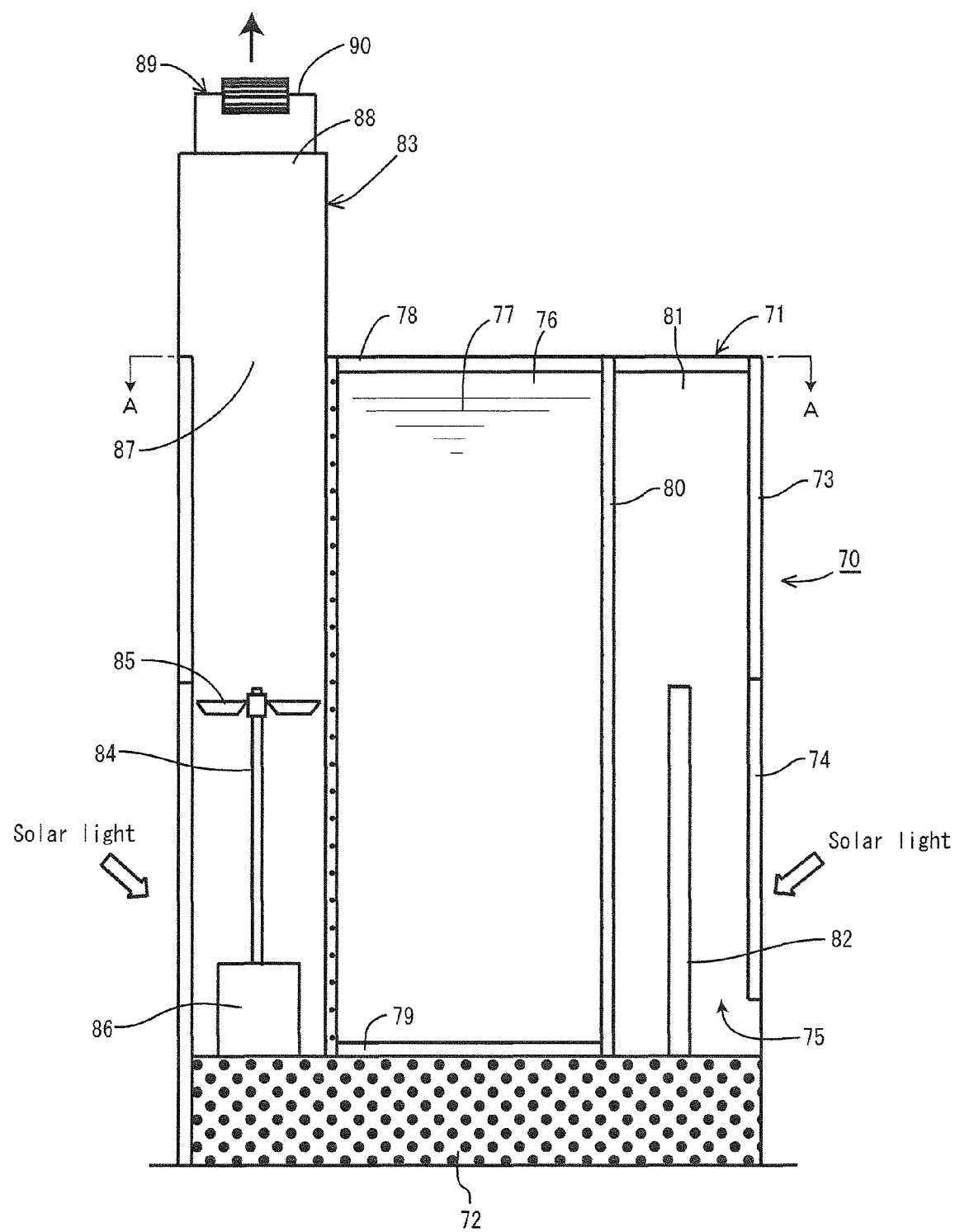
FIG. 11 is a diagram showing the solar thermal power generation apparatus of the embodiment of the present invention and explaining the solar thermal power generation apparatus using thermal heat and temperature difference as natural energy of an applied one of the third example.
Figure 12:
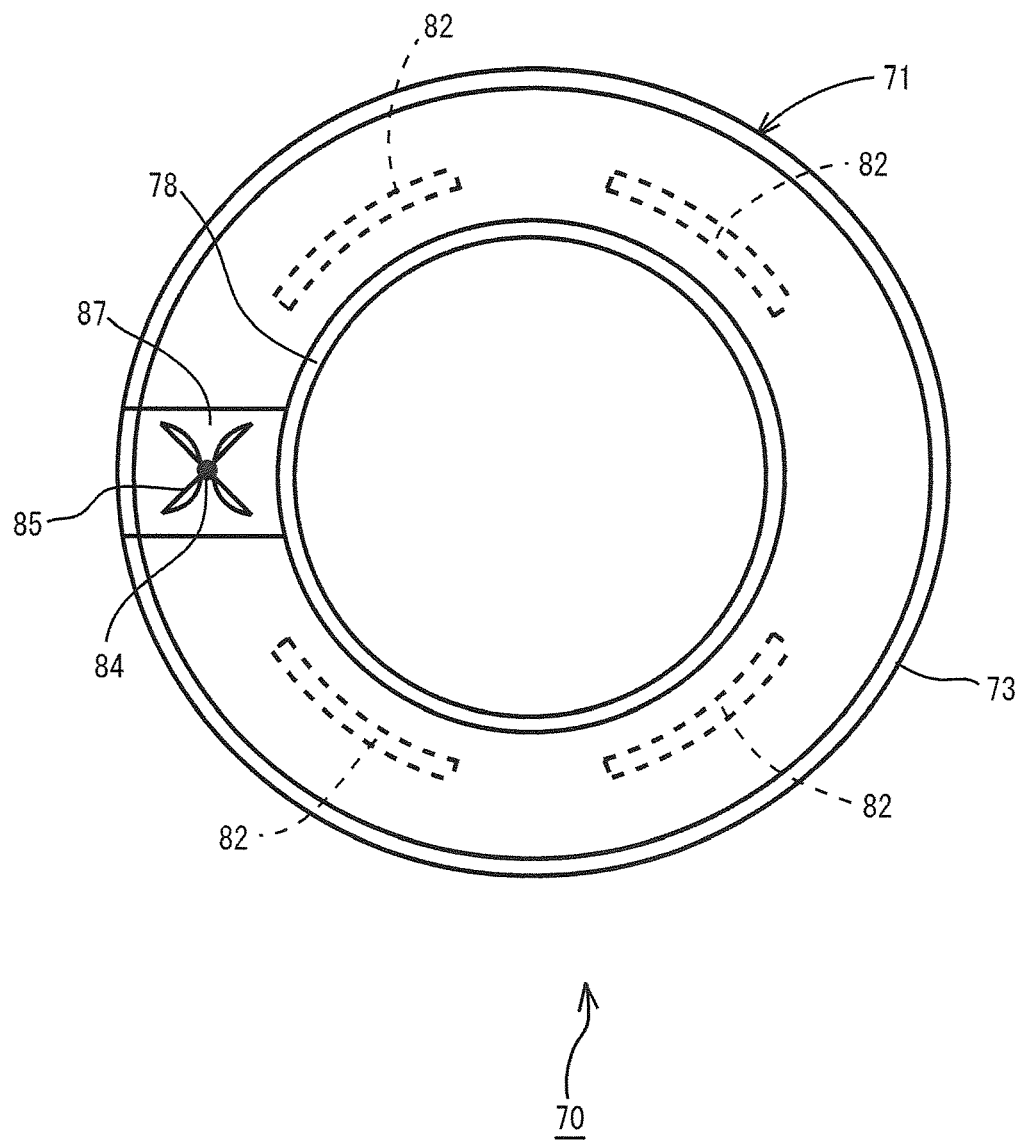
FIG. 12 is a view A-A of FIG. 11.
Figure 13:
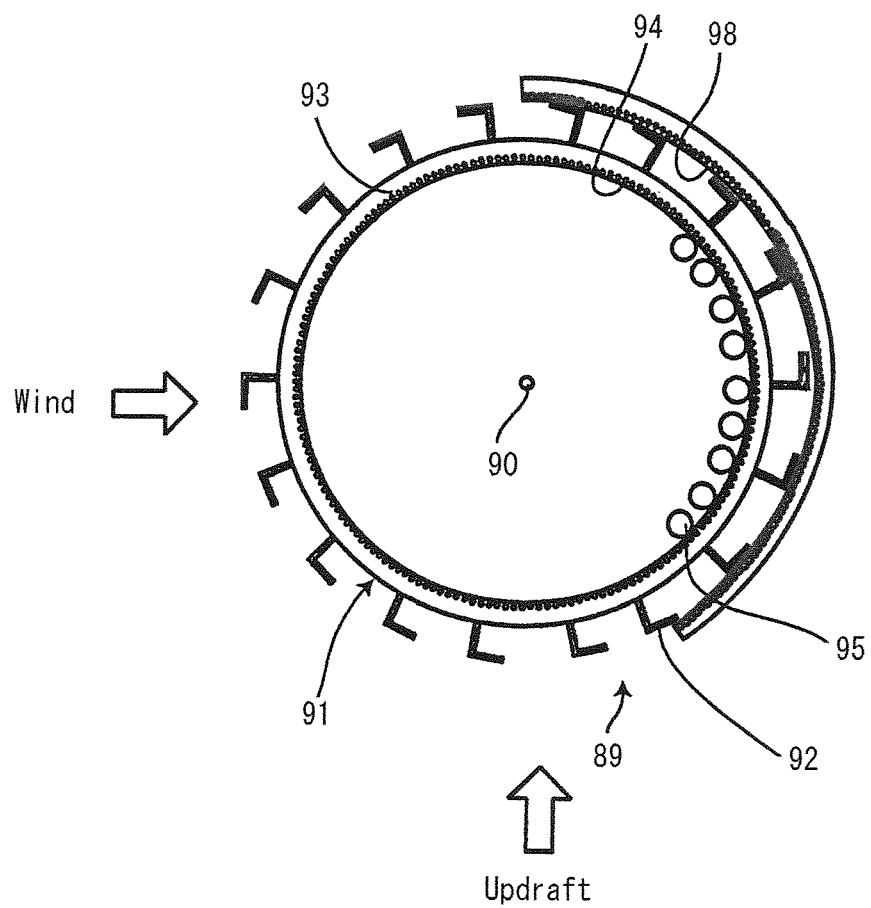
FIG. 13 is a diagram showing the solar thermal power generation apparatus of the embodiment of the present invention and a side view showing a wind mill of the seventh example.

FIG. 11 is a diagram showing a solar thermal power generation apparatus of the embodiment and explaining the solar thermal power generation apparatus of the seventh example which utilizes solar heat and temperature difference as natural energy. FIG. 12 is a diagram of the solar thermal power generation apparatus, taken along a line A-A in FIG. 11. FIG. 13 is a side view showing a wind mill in the seventh example.

A box body 71 of the solar thermal power generation apparatus of the example has a celled and bottomed cylindrical shape and a heat storing member 72 is disposed on a lower surface of the box body 71. An approximately upper half of the outer circumferential wall of the box body 71 is made up of a solar light panel 73 and an approximately lower half of the outer circumferential wall of the box body 71 is made up of a transparent plate 74. In the lower portion of the transparent plate 74, an air intake port 75 is formed.

Inside the box body 71, sealed space 76 having a ceiled and bottomed cylindrical shape is concentrically formed and the inside of the sealed space 76 is filled with a cooling agent such as water. An upper surface of the sealed space 76 is sealed by a radiating plate 78 and its lower surface is sealed by a heat shield material 79 and the outer circumferential wall of the sealed space 76 is made up of a thermoelectric element 80 (for example, Perche element).

Also, in circular space 81 formed inside the box body and outside the thermoelectric element 80, plate-like heat collectors 82 each bent concentrically with the box body 71 are disposed, in a standing manner, at a plurality of places (at four places in FIG. 12) with an interval therebetween and the upper end of each of the heat collectors 82 is so configured as to be higher in position than the air intake port 75.

A funnel 83 is connected to an upper portion of the circular space 81 in the box body 71 and, in the circular space 81 formed in a lower portion of the funnel 83, turbine 85 being rotatable around the vertical axis 84, and a power generator 86 driven by the turbine 85 are disposed. Also, at the lowest end of the funnel 83, the air intake port 87 is formed and, at the upper end of the funnel 83, an exhaust port 88 is formed and, in an upward portion closest to the exhaust port 88, a wind mill 89 is formed.

The wind mill 89 has a circularly cylindrical body 91 rotatable around a horizontal axis 90 and a large number of wheels 92 formed on the outer circumferential wall of the circularly cylindrical body 91 so as to be able to receive a wind. On the internal circumferential surface of the circularly cylindrical body 91, a piezoelectric element 93 and a vibration plate 94 covering the piezoelectric element 93 are formed and, inside the circularly cylindrical body 91, a large number of spherical bodies 95 are formed in a manner to be rolled on the vibration plate 94.

Also, on the outer circumference of the wind mill 89, a semi-circularly cylindrical outer cylindrical body 96 is provided and, on the inner circumferential surface of the outer cylindrical body 96, a piezoelectric element 97 and a vibration plate 98 covering the piezoelectric element 97 are provided in a manner in which each of wheels 92 of the circularly cylindrical body 91 comes into contact with the vibration plate 98 of the outer cylindrical body 96.

In the solar thermal power generation apparatus 70 having configurations as above, air having flown into the inside of the circular space 81 of the box body 71 from the air intake port 75 is heated by the heat collector and, then, the heated air becomes an updraft which rotates the turbine 85, as a result, power is generated by the power generator 86.

When the heated air having become the updraft comes into contact with the outer surface of the thermoelectric element 80, solar light having transmitted through the transparent plate 74 is radiated and, on the other hand, the inner surface of the thermoelectric element 80 is cooled by a cooling agent, which causes a difference in temperature and, as a result, temperature difference power generation is made possible.

The heated air having become the updraft ascends in the funnel 83 and rotates, together with natural wind, the wind mill 89 and then the vibration plate 98 vibrates by the contact of each of the wheels 92 with the vibration plate 98 on the inner circumferential surface of the outer cylindrical body 96, which causes power to be generated in the piezoelectric element 97. Moreover, by the rotation of the wind mill 89, the spherical bodies 95 are configured to be rolled, which provides a shock to the vibration plate 94 on the inner circumferential surface of the circularly cylindrical body 91, as a result, causing the occurrence of power in the piezoelectric element 93.

Furthermore, in the solar thermal power generation apparatus 70 of the embodiment, turbine 85, generator 86, and wind mill 89 are provided, however, these components are not necessarily required.

In this case, the connection of the funnel 83 to the upper portion of the box body 71 is not necessarily required and, for example, part (portion where the turbine 85 and power generator 86 are mounted) of the circular space 81 of the box body 71 may be used as the funnel 83.

Though not shown, heat collecting effect can be improved by providing a light-collecting lens on the outer circumferential wall of the box body 71 or by a reflection plate which reflects solar light at the box body 71 on the north side of the box body 71.

The installation location and range of the above-described heat storing member 72, solar light panel 73, and transparent plate 74 are by way of example only and do not limit the scope of the invention.

What is claimed is:

1. A solar thermal power generation apparatus comprising:
a turbine rotatable around a vertical axis;
a power generator driven by the turbine;
a funnel disposed along the vertical axis so as to house the turbine and having an intake port at a lower end of the funnel;
a transparent box body disposed so as to surround a lower portion of the funnel and having an air intake port at a position being lower than the intake port; and
a heat collector disposed in a standing manner at a distance between the box body and the funnel wherein an upper end of the heat collector is at a position being higher than the intake port;
wherein, after air having flown from the air intake port into an inside of the box body is heated by the heat collector, the heated air becomes an updraft flowing from the intake port into an inside of the funnel to rotate the turbine, which causes the power generator to generate power, and
wherein the funnel comprises an introducing side cylindrical portion constituting the lower portion of the funnel and facing the inside of the box body and the exhaust side cylindrical portion positioned in an upper portion of the box body, wherein the exhaust side cylindrical portion has a vibration plate and a piezoelectric element and the vertical axis has wheels each being contactable with the vibration plate.

2. A solar thermal power generation apparatus comprising:
a funnel having a cylindrical thermoelectric element and an intake port formed at a lower end of the funnel;
sealed space formed outside the thermoelectric element and having an inside portion filled with a cooling agent;
a transparent box body disposed so as to surround a lower portion of the funnel wherein an air intake port is formed at a position being lower than the intake port; and
a heat collector disposed in a standing manner at a distance between the box body and the funnel wherein an upper end of the heat collector is placed in a position being higher than the intake port;
wherein, after air having flown from the air intake port into an inside of the box body is heated by the heat collector, the heated air becomes an updraft flowing from the intake port into an inside of the funnel to come into contact with an inner side of the thermoelectric element and an outer side of the thermoelectric element comes into contact with a cooling agent which causes the occurrence of a temperature difference, thus enabling temperature difference power generation.

3. The solar thermal power generation apparatus according to claim 2, wherein a heat storing member is placed in a lower portion of the funnel.

4. A solar thermal power generation apparatus comprising:
a turbine rotatable around a vertical axis;
a power generator driven by the turbine;
a funnel disposed along the vertical axis so as to house the turbine and having an intake port at a lower end of the funnel;
a transparent box body disposed in a lower direction of the turbine in a manner to be contracted and closed from a lower direction toward an upper direction of the turbine;
a heat collector disposed inside the box body with an interval between the heat collector and box body and to be contracted and closed from a lower direction of the heat collector toward a direction of the turbine and having a spraying cylindrical portion disposed integrally at an upper end of the heat collector with a predetermined interval between the box body and the heat collector in an opposite manner;
an air intake port formed at a lower end of the box body;
an intake port formed at a lower end of the heat collector; and
a heat storing member disposed in the spraying cylindrical portion;
wherein, after air having flown from the air intake port and the intake port into the inside of the box body and the flown air is heated by the heat collector, the heated air is used as an updraft to rotate the turbine, which causes the power generator to generate power.

5. A solar thermal power generation apparatus comprising:
a funnel having an exhaust port formed at an upper end of the funnel and an intake port formed at a lower end of the funnel;
a transparent box body having an air intake port formed at a position being lower than the intake port of the funnel;
sealed space formed inside the box body and having an inside portion filled with a cooling agent;
a thermoelectric element constituting an outer circumferential wall of the sealed space; and
a heat collector disposed, in a standing manner, inside the box body existing outside the thermoelectric element and having an upper end placed in a position being higher than the air intake port;
wherein, after air having flown from the air intake port into an inside of the box body is heated by the heat collector, the heated air becomes an updraft flowing from the intake port into an inside of the funnel to be exhausted from the exhaust port and wherein the thermoelectric element is heated by solar light having transmitted through the box body.

6. The solar thermal power generation apparatus according to claim 5, further comprising a turbine rotatable around the vertical axis and a power generator driven by the turbine, wherein, after air having flown from the air intake port into an inside of the box body is heated by the heat collector, the heated air becomes an updraft flowing from the intake port into an inside of the funnel to rotate the turbine, which causes the power generator to generate power.

7. The solar thermal power generation apparatus according to claim 5, wherein an outer circumferential wall of the box body is constructed of a solar light panel and a transparent plate.

8. The solar thermal power generation apparatus according to claim 5, further comprising a wind mill being rotatable by the heated air having become the updraft and a generator driven by the wind mill and wherein the wind mill comprises a circularly cylindrical body being rotatable around the vertical axis and a large number of wheels attached to an outer circumferential wall of the circularly cylindrical body so as to be able to receive a wind.

9. A solar thermal power generation apparatus comprising:
a turbine rotatable around a vertical axis;
a power generator driven by the turbine;
a funnel disposed along the vertical axis so as to house the turbine and having an intake port at a lower end of the funnel;
a transparent box body disposed so as to surround a lower portion of the funnel and having an air intake port at a position being lower than the intake port; and
a heat collector disposed in a standing manner at a distance between the box body and the funnel wherein an upper end of the heat collector is at a position being higher than the intake port;
a wind mill being rotatable by the heated air having become the updraft and a generator driven by the wind mill and wherein the wind mill comprises a circularly cylindrical body being rotatable around the vertical axis and a large number of wheels attached to an outer circumferential wall of the circularly cylindrical body so as to be able to receive a wind; and a piezoelectric element and a vibration plate covering the piezoelectric element disposed on an inner circumferential surface of the circularly cylindrical body, a large number of spherical bodies inside the circularly cylindrical body so as to be rolled on the vibration plate, semi-circularly cylindrical outer cylindrical body disposed on an outer circumference of the wind mill, the piezoelectric element and vibration plate disposed in an inner circumferential surface of the outer cylindrical body, wherein each of the wheels formed on the circularly cylindrical body is in contact with the vibration plate of the outer cylindrical body,
wherein, after air having flown from the air intake port into an inside of the box body is heated by the heat collector, the heated air becomes an updraft flowing from the intake port into an inside of the funnel to rotate the turbine, which causes the power generator to generate power, and
wherein the vertical axis extrudes in an upward direction of the funnel and a wind mill is attached to the extruded portion.

10. A solar thermal power generation apparatus comprising:
a funnel having an exhaust port formed at an upper end of the funnel and an intake port formed at a lower end of the funnel;
a transparent box body having an air intake port formed at a position being lower than the intake port of the funnel;
sealed space formed inside the box body and having an inside portion filled with a cooling agent;
a thermoelectric element constituting an outer circumferential wall of the sealed space; and
a heat collector disposed, in a standing manner, inside the box body existing outside the thermoelectric element and having an upper end placed in a position being higher than the air intake port;
a wind mill being rotatable by the heated air having become the updraft and a generator driven by the wind mill and wherein the wind mill comprises a circularly cylindrical body being rotatable around the vertical axis and a large number of wheels attached to an outer circumferential wall of the circularly cylindrical body so as to be able to receive a wind; and
a piezoelectric element and a vibration plate covering the piezoelectric element disposed on an inner circumferential surface of the circularly cylindrical body, a large number of spherical bodies inside the circularly cylindrical body so as to be rolled on the vibration plate, semi-circularly cylindrical outer cylindrical body disposed on an outer circumference of the wind mill, the piezoelectric element and vibration plate disposed in an inner circumferential surface of the outer cylindrical body, wherein each of the wheels formed on the circularly cylindrical body is in contact with the vibration plate of the outer cylindrical body
wherein, after air having flown from the air intake port into an inside of the box body is heated by the heat collector, the heated air becomes an updraft flowing from the intake port into an inside of the funnel to be exhausted from the exhaust port and wherein the thermoelectric element is heated by solar light having transmitted through the box body.

* * * * *